May 16, 1950 — E. A. BINNEY — 2,508,139
MOTOR SUSPENSION
Filed April 30, 1945
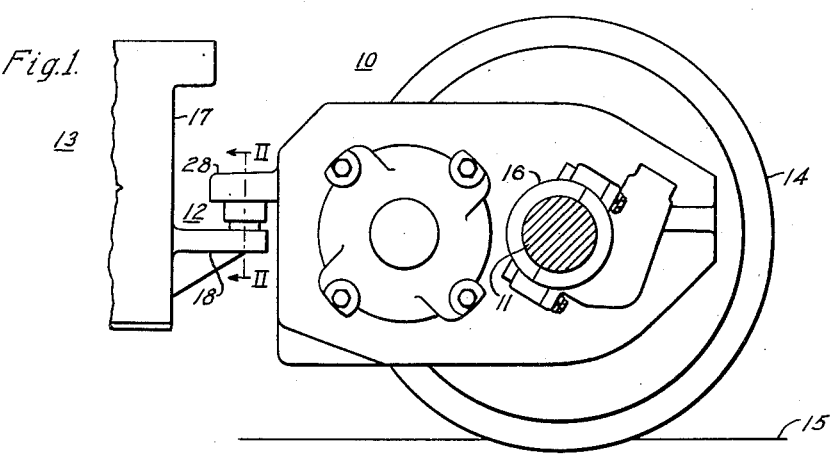
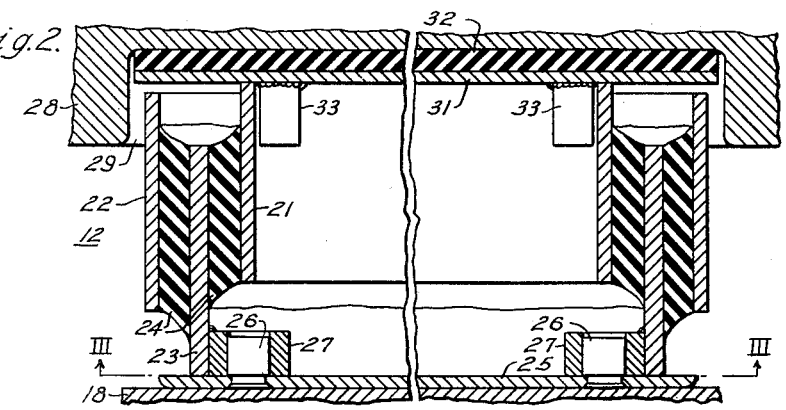
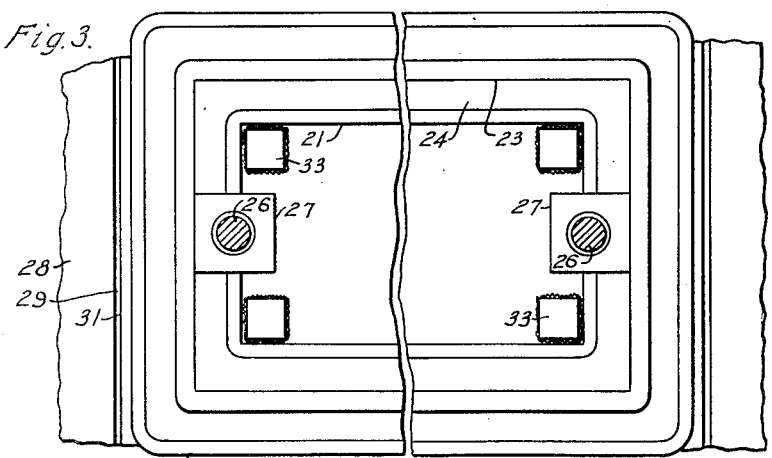
WITNESSES:
INVENTOR
Eric A. Binney.
BY
ATTORNEY Patented May 16, 1950

2,508,139

UNITED STATES PATENT OFFICE 2,508,139

MOTOR SUSPENSION

Eric Alton Binney, Ilkley, England, assignor to The English Electric Company Limited, London, England, a British company Application April 30, 1945, Serial No. 591,074
In Great Britain May 10, 1944

5 Claims. (Cl. 105—132.1)

My invention relates, generally, to suspensions for electric motors which drive vehicles and, more particularly to resilient supports for axle-hung motors.

Heretofore an axle-hung motor has been mounted in the truck of a vehicle with the nose of the motor frame resiliently supported on a transverse member forming part of the truck frame or undercarriage by means of compression springs or a solid block of rubber stressed primarily in compression.

An object of my invention, generally stated, is to provide a nose suspension for an axle-hung motor which shall be flexible in operation and which may be economically manufactured and installed.

A more specific object of my invention is to provide a resilient support in which the stress on the resilient material is primarily in shear.

Another object of my invention is to provide a resilient support in which the resistance to load increases as the load is increased.

Other objects of my invention will be explained fully hereinafter or will be apparent to those skilled in the art.

According to my invention, the nose of an axle-hung traction motor is supported by a resilient support including at least two upstanding plates so bonded together by a layer of rubber, or similar material, that the load on the motor moves one of the plates relatively to the other so as to stress the rubber primarily in shear. There may be inner and outer plates bonded to opposite faces of an intermediate plate by separate layers of rubber between which the load is divided. Also, rectangular frames may be disposed one within the other and bonded together by rubber, or similar resilient material.

For a fuller understanding of the nature and objects of the invention, reference may be had to the following detailed description, taken in conjunction with the accompanying drawing in which:

Figure 1 is a view in side elevation of an axle-hung motor with a nose suspension unit constructed in accordance with my invention;

Fig. 2 is an enlarged view, in section, taken along the line II—II of Fig. 1; and Fig. 3 is an enlarged view, partly in bottom plan and partly in section, the section being taken along the line III—III of Fig. 2.

Referring now to the drawing, and particularly to Fig. 1, the structure shown therein comprises an axle-hung motor 10 having one side supported by a wheel axle 11 and the other side resiliently supported by a suspension unit 12 in a vehicle truck frame 13, only a portion of which is shown. The motor 10 may be of the usual axle-hung type suitable for driving an electrically propelled vehicle equipped with wheels 14 which run on rails 15. One side of the motor 10 is mounted on the axle 11 by means of a bearing 16, which may be of the sleeve type. The motor 10 may be geared to the axle 11 in the usual manner by means of gear members (not shown). The suspension unit 12 functions to counteract the torque of the motor when it is operating in one direction only. When operating in the other direction, the torque may be counteracted by other well known means, such as a link connecting the motor frame to the truck frame, not shown in the present drawing.

The vehicle truck 13 may be of any standard type having a cross member or transom 17. The transom 17 is provided with a horizontally extending lug or bracket 18 for supporting the side of the motor 10 opposite the axle 11.

As explained hereinbefore, it is customary to provide a resilient suspension or supporting unit for the nose of the motor 10. According to one embodiment of the present invention, the resilient support 12 comprises an inner rectangular frame 21 and an outer rectangular frame 22, which are spaced from and bonded to an intermediate rectangular frame 23 by separate layers of rubber or a similar resilient material 24.

As shown most clearly in Fig. 2, the supporting frames are so disposed that upon application of load to the resilient mounting the rubber is stressed primarily in shear. It will be understood that upstanding plates spaced and disposed in the manner of the end plates of the frames 21, 22 and 23 may be utilized if desired.

As shown, the intermediate frame 23 consists of an open box-like structure with its base resting on the bracket 18 of the truck frame 13 and so disposed as to allow relative horizontal movement between the intermediate frame and the bracket 18. In order to prevent the base of the intermediate frame 23 from wearing because of this relative horizontal movement, a replaceable rubbing plate 25 is interposed between the bottom of the intermediate frame 23 and the top of the bracket 18. The rubbing plate 25 may be retained in position by dowel pins 26 inserted into openings provided in bosses 27 disposed on the inside of the frame 23.

The layers of rubber 24 are bonded to the inner and outer faces of the upstanding sides of the intermediate frame 23, and these layers are also bonded to the inner and outer frames in such a way as to allow a relative vertical movement between the intermediate and the inner and outer frames. The inner and outer frames are disposed respectively inside and outside the intermediate frame and project above the intermediate frame so that any vertical load applied to the upper faces of the inner and outer frames is transmitted through the rubber, which is stressed primarily in shear, to the intermediate frame and thus to the bracket 18 on the truck frame 13.

In this manner the inner and outer frames support the nose 28 of the motor 10 and may enter a cavity 29 in the nose 28. As shown in Fig. 2, either the inner or the outer frame may project a slight distance above the other. Thus, when a light load is applied to the resilient mounting, the rubber between the intermediate frame 23 and the frame which projects the higher is first subjected to stress. Further application of load brings both the inner and outer frames into line, thereby stressing both sections of rubber and increasing the resistance to the load.

Since the cavity in the motor nose will usually have a rough cast surface, it is desirable to provide some means of distributing the load evenly over the top surfaces of the inner and outer frames 21 and 22. As shown, this may be done by means of an equalizing plate 31, which rests on the top surface of either the inner or outer frames or both. The top surface of the equalizing plate 31 is provided with a layer of rubber 32 so that any inequalities on the surface of the motor nose are evened out by the rubber 32. The equalizing plate 31 may rest loosely on the top surface of the frames 21 and 22 and may be retained in position by guide members 33. If desired, the equalizing plates may be secured to either one or both of the inner and outer frames.

From the foregoing description it is apparent that I have provided a resilient support which is particularly suitable for supporting the nose of an axle-hung traction motor, but is not necessarily limited to such applications. The resilient support requires only a relatively small amount of rubber or similar material, which is stressed in shear rather than in compression as in previously known supports.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. Means for resiliently supporting the nose of an axle-hung motor in a vehicle truck frame comprising an inner and an outer plate bonded to opposite faces of an intermediate plate by separate layers of resilient material, said plates being detached from the motor and the truck frame and so disposed between the nose of the motor and the truck frame that the weight and the torque of the motor when operating in one direction stress the resilient material primarily in shear and the plates are movable horizontally relative to the truck frame.

2. Means for resiliently supporting the nose of an axle-hung motor in a vehicle truck frame comprising an inner plate, an outer plate, an intermediate plate offset from the inner and outer plates and bonded thereto by separate layers of resilient material, said plates being detached from the motor and the truck frame and so disposed between the nose of the motor and the truck frame that the weight and the torque of the motor when operating in one direction stresses the resilient material primarily in shear and the plates are movable horizontally relative to the truck frame.

3. Means for resiliently supporting the nose of an axle-hung motor in a vehicle truck frame comprising an inner frame and an outer frame bonded to an intermediate frame by resilient material, said frames being detached from the motor and the truck frame and so disposed between the nose of the motor and the truck frame that the weight and the torque of the motor when operating in one direction stress the resilient material primarily in shear and the frames are movable laterally relative to the truck frame.

4. Means for resiliently supporting the nose of an axle-hung motor in a vehicle truck frame comprising an inner frame and an outer frame bonded to an intermediate frame by resilient material, said intermediate frame projecting below the other frames, said frames being detached from the motor and the truck frame and so disposed between the nose of the motor and the truck frame that the weight and the torque of the motor when operating in one direction stress the resilient material primarily in shear and the frames are movable laterally relative to the truck frame.

5. Means for resiliently supporting the nose of an axle-hung motor in a vehicle truck frame comprising an inner frame and an outer frame bonded to an intermediate frame by resilient material, said intermediate frame projecting below the other frames, one of said frames projecting above the other frames, said frames being detached from the motor and the truck frame and so disposed between the nose of the motor and the truck frame that the weight and the torque of the motor when operating in one direction stress the resilient material primarily in shear and the frames are movable laterally relative to the truck frame.

ERIC ALTON BINNEY.

REFERENCES CITED

The following references are of record in the file of this patent:

UNITED STATES PATENTS

| Number | Name | Date |
|--------|------|------|
| 429,746 | Van Depoele | June 10, 1890 |
| 2,138,175 | Keys | Nov. 29, 1938 |
| 2,184,102 | Piron | Dec. 19, 1939 |
| 2,248,869 | Harwick | July 8, 1941 |
| 2,257,804 | Lord | Oct. 7, 1941 |
| 2,260,508 | Chambers | Oct. 28, 1941 |
| 2,277,835 | Alben | Mar. 31, 1942 |

FOREIGN PATENTS

| Number | Country | Date |
|--------|---------|------|
| 390,615 | Great Britain | Apr. 13, 1933 |